US012091231B1

(12) United States Patent
Squires et al.

(10) Patent No.: US 12,091,231 B1
(45) Date of Patent: Sep. 17, 2024

(54) CONTAMINANT RESISTANT PRODUCT PACKAGING

(71) Applicants: Charlotte C. Squires, Spokane Valley, WA (US); Cole Gunderson, Mapleton, UT (US)

(72) Inventors: Charlotte C. Squires, Spokane Valley, WA (US); Cole Gunderson, Mapleton, UT (US)

( * ) Notice: Subject to any disclaimer, the term of this patent is extended or adjusted under 35 U.S.C. 154(b) by 0 days.

(21) Appl. No.: 18/385,829

(22) Filed: Oct. 31, 2023

(51) Int. Cl.
| | |
|---|---|
| B65D 81/26 | (2006.01) |
| B01D 39/14 | (2006.01) |
| B32B 3/26 | (2006.01) |
| B32B 5/02 | (2006.01) |
| B32B 5/26 | (2006.01) |

(Continued)

(52) U.S. Cl.
CPC ........... B65D 81/263 (2013.01); B01D 39/14 (2013.01); B32B 3/266 (2013.01); B32B 5/022 (2013.01); B32B 5/024 (2013.01); B32B 5/26 (2013.01); B65D 51/16 (2013.01); B65D 51/24 (2013.01); B65D 65/40 (2013.01); B65D 77/2024 (2013.01); B65D 81/34 (2013.01); *B01D 2239/0613* (2013.01); *B01D 2239/0618* (2013.01); *B01D 2239/0654* (2013.01);

(Continued)

(58) Field of Classification Search
CPC .... B01D 2239/0613; B01D 2239/0618; B01D 2239/0654; B01D 39/14; B32B 2553/00; B32B 3/266; B32B 5/022; B32B 5/024; B32B 5/26; B65D 2205/00; B65D 2543/00425; B65D 2565/387; B65D 2565/388; B65D 5/4295; B65D 51/16; B65D 51/24; B65D 65/02; B65D 65/14; B65D 65/40; B65D 65/42; B65D 77/20; B65D 77/2024; B65D 81/263; B65D 81/34
USPC ............................... 220/203.01, 203.29, 371
See application file for complete search history.

(56) References Cited

U.S. PATENT DOCUMENTS

| | | | |
|---|---|---|---|
| 8,087,827 B2 * | 1/2012 | Mir .................... | B65D 33/01 426/118 |
| 10,399,762 B2 * | 9/2019 | Inagaki ............... | B65D 65/02 |

(Continued)

FOREIGN PATENT DOCUMENTS

| | | | | |
|---|---|---|---|---|
| DE | 102012017156 A1 * | 3/2014 | .......... | B01D 5/0018 |
| FR | 2852931 A1 * | 10/2004 | ............. | B32B 27/08 |

*Primary Examiner* — Nathan J Jenness
*Assistant Examiner* — Madison L Poos
(74) *Attorney, Agent, or Firm* — Bamert Regan PLLC; Raymond Armentrout (57) ABSTRACT

Embodiments are directed toward a product package filter assembly that prevents ambient contaminates from entering into the sealable product container. In some embodiments, the product package filter assembly includes an optional support element, a filter element, and a surface film element that are layered together with the filter element between the support element and the surface film element. The perimeters of the support element, the filter element, and the surface film element are sealably joined together. The product package filter assembly is then sealably joined over an opening of a product container. During heating of a product residing in the product container, gases generated in the product container vent out through the product package filter assembly, while the filter element prevents entry of contamination particles into the product container.

20 Claims, 9 Drawing Sheets

(51) Int. Cl.
*B65D 51/16* (2006.01)
*B65D 51/24* (2006.01)
*B65D 65/40* (2006.01)
*B65D 77/20* (2006.01)
*B65D 81/34* (2006.01)

(52) U.S. Cl.
CPC ...... *B32B 2553/00* (2013.01); *B65D 2205/00* (2013.01); *B65D 2565/387* (2013.01)

(56) References Cited

U.S. PATENT DOCUMENTS 10,781,018 B1 * 9/2020 Squires .................. B65D 81/34
11,136,177 B1 * 10/2021 Mir ...................... B65D 75/366

* cited by examiner

CONTAMINANT RESISTANT PRODUCT PACKAGING

BACKGROUND OF THE INVENTION

The present disclosure relates generally to product packaging. Known product packaging is not satisfactory for situations where contamination from ambient contaminants is of concern. For example, a gluten free product cannot be processed in an ambient environment that is not entirely free of gluten particles. In such situations where cooking, heating, storage, and/or handling occurs in an ambient environment with gluten contamination, the gluten free product may become contaminated with gluten particles from the ambient environment during processing and/or during handling of the gluten free product.

As another example, some individuals are highly allergic to peanuts or other types of particles. When a meal is prepared for such at-risk individuals, special procedures and/or equipment is required for safe food preparation so that the prepared meal is not contaminated with any peanut particles or other particles of interest.

As yet another example, biological contaminants such as bacteria and/or viruses might enter into a product package. For example, food may be prepared and then transported to another location for consumption. Biological contaminants might enter into the product package during transportation, thereby contaminating the food and placing the consumer's health at risk.

As yet another example, some non-food product items may need to be sterilized in a package such that ambient contaminants do not enter the product package during and/or after sterilization. An example is sterilization of medical equipment.

Accordingly, there exists a need in the product packaging arts for improved product packaging that protects packaged products for contaminants.

SUMMARY OF THE INVENTION

The present disclosure is directed to embodiments of a product package filter assembly that prevents ambient contamination particles from entering into the sealable product container. In some embodiments, the product package filter assembly includes an optional support element, a filter element, and a surface film element that are layered together with the filter element between the support element and the surface film element. The perimeters of the support element, the filter element, and the surface film element are sealably joined together. The product package filter assembly is then sealably joined over an opening of a product container. During heating of a product residing in the product container, gasses generated in the product container vent out through the product package filter assembly, while the filter element prevents entry of any ambient contamination particles into the product container.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Heating of a product residing in a product container generates steam and/or other gases (interchangeably referred to herein as a gas). Heating as generically referred to herein corresponds to any temperature change that may occur within a package and/or a product within the package. A temperature increase will expand any gasses residing in the package. A temperature increase in the product will expand any gases in the product and/or generate vapor with will expand with increasing temperature. Cooling will result in a volume decrease in any gas within the package (interchangeably referred to herein as a product container). In some situations, the product may absorb moisture during cooling. The temperature change (heating or cooling) may be intentionally induced, such as by heating in an oven, heating in a microwave, heating on a stove top element, heating in an autoclave, cooling in a refrigerator, or the like. In some situations, the temperature change may occur due to naturally occurring changes in ambient air temperature. All such induced temperature changes or naturally occurring temperature changes are contemplated herein.

When a contaminant filter assembly 100 embodiment is sealably joined to an opening in the product container, the contaminant filter assembly 100 permits expanding gas within the package and/or that is generated by the heating of the product to vent out from the product package filter assembly into an ambient region while preventing ambient contamination particles from entering into the interior of the product container. Conversely, cooling will decrease the volume of any gas within the package. Accordingly, the contaminant filter assembly 100 permits entry of ambient gas (air) into the package. Further, moisture may pass through the contaminant filter assembly 100 and enter into the package during cooling.

Embodiments of a disclosed product package filter assembly 100 will become better understood through review of the following detailed description in conjunction with the figures. The detailed description and figures merely provide examples of the various invention embodiments described herein. Those skilled in the art will understand that the disclosed example embodiments may be varied, modified, and altered without departing from the scope of the invention as described herein. Many variations are contemplated for different applications and design considerations. However, for the sake of brevity, each and every contemplated variation is not individually described in the following detailed description.

Throughout the following detailed description, example embodiments of various product package filter assembly 100 embodiments are provided. Related features in the example embodiments may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example embodiment.

As used herein, the following terms take the meanings explicitly associated herein, unless the context clearly dictates otherwise. The terms "front," "forward," "rear," and "rearward" are defined relative to an identified front element. The terms "height," "vertical," "upper," "lower," "above," "below," "top," "bottom," "topmost," and "bottom-most" are defined relative to a vertical axis of a product package filter assembly 100. The vertical axis is non-parallel to the longitudinal axis and is defined as parallel to the direction of the earth's gravity force on the product package filter assembly 100 when the product package filter assembly 100 is on horizontal ground. The term "lateral" is defined relative to the lateral axis of the product package filter assembly 100. The lateral axis is non-parallel to the longitudinal and vertical axes of the product package filter assembly 100. The longitudinal axis is referenced to a longest length, if present, of the product package filter assembly 100.

The following definitions apply herein, unless otherwise indicated. "Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

The term "configured" as used herein means an element being one or more of sized, dimensioned, positioned, or oriented to achieve or provide the recited function or result. The term "directly coupled" as used herein means that a component contacts (for example, when bolted) another component. The term "indirectly coupled" as used herein means that a first component is coupled to a second component by way of one or more intervening components that are directly coupled to the first and second components. A first component that is indirectly coupled to a second component is directly coupled to a third component, which may be directly coupled to the second component or to a fourth component that is directly coupled to the second component. "Coupled" means connected, either permanently or releasably, whether directly or indirectly, through intervening components. The term "coupled" should therefore be understood to disclose both direct and indirect coupling of components or elements that are described as being coupled to each other.

The term to "sealably join" or the like is defined to mean that two adjacent surfaces of one or more elements of the product package filter assembly 100, and/or a product container, are affixed together (sealed together, or joined) in a manner such that fluids and/or gasses cannot pass between the two or more joined surfaces. That is, when two elements are sealably joined together, gas and/or liquids cannot pass through the sealing means and the two or more sealably joined surfaces. A variety of sealing means may be used in the various embodiments of the contaminant filter assembly 100. An example sealing means includes a bead or strip of adhesive. Any suitable sealing means may be used in alternative embodiments. Such sealing means include, but are not limited to, crimping, heat sealing, induction sealing, pleating, sewing, or the like.

"Comprising," "including," and "having" (and conjugations thereof) are used interchangeably to mean including but not necessarily limited to, and are open-ended terms not intended to exclude additional elements or method steps not expressly recited. Terms such as "first", "second", and "third" are used to distinguish or identify various members of a group, or the like, and are not intended to denote a serial, chronological, or numerical limitation.

The term "or" is an inclusive grammatical conjunction to indicate that one or more of the connected terms may be employed. For example, the phrase "one or more A, B, or C" or the phrase "one or more As, Bs, or Cs" is employed to discretely disclose each of the following: i) one or more As, ii) one or more Bs, iii) one or more Cs, iv) one or more As and one or more Bs, v) one or more As and one or more Cs, vi) one or more Bs and one or more Cs, and vii) one or more As, one or more Bs, and one or more Cs. The term "based on" as used herein is not exclusive and allows for being based on additional factors not described. The articles "a," "an," and "the" include plural references. Plural references are intended to also disclose the singular.

Figure 1:
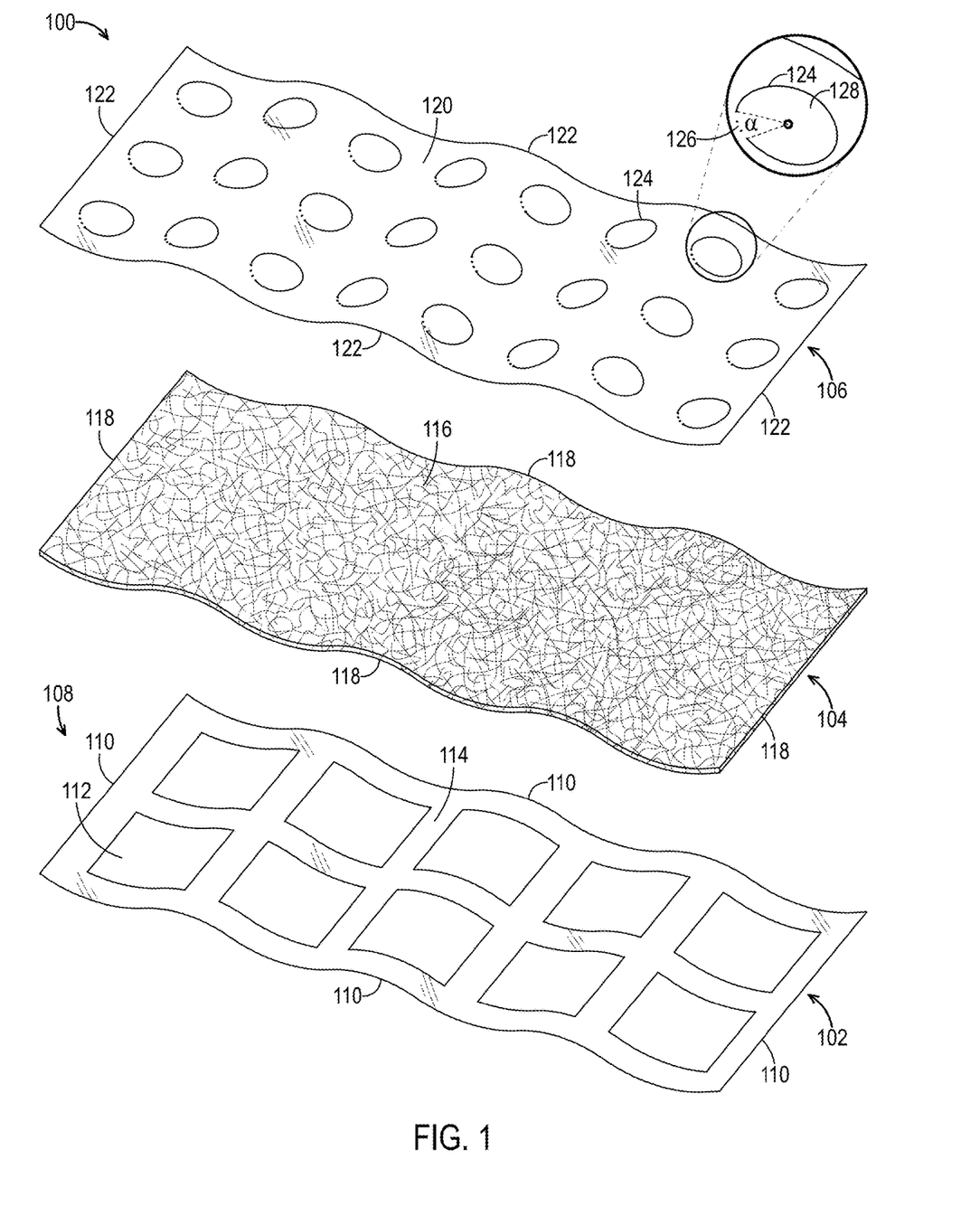
FIG. 1 is an exploded view of a product package filter assembly.

FIG. 1 is an exploded view of a product package filter assembly 100 before fabrication. Embodiments of the product package filter assembly 100 comprise an optional support element 102, a filter element 104, and a surface film element 106.

The support element 102 is defined by a support element body portion 108 and a support element perimeter 110. The support element perimeter 110 defines an edge of the support element body portion 108.

In a preferred embodiment, a plurality of apertures 112 are disposed in the support element body portion 108 such that a plurality of support members 114 are defined between adjacent apertures 112. The plurality of apertures 112 may be of any size or shape of interest, such as, but not limited to, circles, rectangles, or the like. In another embodiment, a single aperture is disposed in the support element body portion 108 such that the plurality of support members 114 are defined along and proximate to the support element perimeter 110.

The filter element 104 is defined by a filter element body 116 and a filter element perimeter 118. The filter element 104 is made of a suitable filter material that is a barrier to solid particulates while allowing passage of gas through the filter element 104. In some embodiments, the filter element 104 may be constructed from a plurality of woven fibers and/or non-woven fibers. The random arrangement of the fiber density and/or fiber arrangement of the fibers, such as but not limited to cellulose fibers, is used to control the size of the micro-pores that block passage of solid particles. Solid ambient contamination particles may include, but are not limited to, dust, pollen, mold, gluten dust, peanut dust, bacteria, and/or viruses. In an example embodiment, the filter element 104 is made of a high-efficiency particulate arresting (HEPA) grade filter material. For convenience, some embodiments of the filter element 104 may be made of readily available N95 filter materials. A N95 filter meets the U.S. National Institute for Occupational Safety and Health N95 classification of air filtration, wherein at least 95% of airborne solid particles that have a mass median aerodynamic diameter of 0.3 microns are blocked by the N95 grade filter material.

Preferably, the filter element 104 is made of a flexible or semi-flexible material to facilitate fabrication of a product package filter assembly 100. The flexibility facilitates the sealable joining of the product package filter assembly 100 to a product container as described in greater detail hereinbelow. Some embodiments may employ a rigid, or semi-rigid filter element 104. Any suitable filter material now known or later developed may be used in the various embodiments without departing from the spirit and scope of the present invention, and are intended to be protected by the accompanying claims.

The surface film element 106 is defined by a surface film element body 120 and a surface film element perimeter 122. The surface film element 106 is made of a suitable film material that is preferably flexible or semi-flexible.

A plurality of micro-cuts 124 are disposed on the surface film element body 120. Each micro-cut 124 is a cut made through the entirety of the surface film element body 120. In a preferred embodiment, the micro-cuts 124 may be a semicircular cut. In other embodiments, the micro-cuts 124 may be a curved cut, an oval cut, a square cut, a rectangular cut, a triangular cut, and/or another cut wherein the ends of the cut are not joined together, thereby defining a fold line 126. The micro-cuts 124 may be of any predefined length (perimeter length). In some alternative embodiments, a micro-cut 124 may be a straight line cut of a predefined length. The micro-cuts 124 may be made in any suitable manner using any suitable cutting means, such as a die and punch, a cutting edge, a laser, or the like. The micro-cuts 124 may be made as part of the film fabrication process in some embodiments.

In the various embodiments, each micro-cut 124 and a corresponding fold line 126 cooperatively define a hinged surface portion 128. When an internal pressure on the interior side of the hinged surface portion 128 exceeds the external air pressure on the opposing side of the hinged surface portion 128, the hinged surface portion 128 moves outwardly towards the lower pressure exterior so that gas may pass through the micro-cut 124 from the high pressure region to the lower pressure exterior region.

As noted above, the micro-cut 124 opens in response to a pressure difference to allow gas to pass from a high pressure region to the lower pressure exterior region. In the various embodiments, when the pressure is the same on both sides of the surface film element body 120, the micro-cuts 124 remain closed to prevent passage of solid particles through the micro-cuts 124. An unexpected benefit provided by layering the surface film element 106 disposed over and on top of the filter element 104 is that if the exterior pressure exceeds the pressure on the interior side of the hinged surface portion 128, the hinged surface portion 128 cannot open because the filter element 104 blocks the hinged movement of the hinged surface portion 128. Accordingly, ambient contamination particles are prevented from passing, or at least cannot easily pass through, the closed micro-cuts 124 on the surface film element 106.

In the example embodiment illustrated in FIG. 1, the micro-cuts 124 are semicircular. The ends of the semicircular cut 124 are relatively close together. For example, with respect to a semicircular cut 124, the angle α corresponds to a predefined angle selected from an angle range of between 15° to 20°, though any suitable angle may be used in the various embodiments to predefine the length of the fold line 126. An unexpected benefit of a relatively small predefined angle α is that the length of the fold line 126 is relatively short. Accordingly, when generated gas passes through the contaminant filter assembly 100, the relatively short fold line 126 exerts less resistance to the upward movement of the hinged surface portion 128 (as compared to the resistance from a longer fold line 126).

During fabrication, in one embodiment, a small perimeter edge portion of a circular die is removed to define the fold line 126 in accordance with the angle α. When the die and corresponding punch are used to create the semicircular cut 124, a relatively small amount of the film is not cut, thereby defining the fold line 126. When a plurality of dies are aligned together on a die support structure, and when a corresponding plurality of aligned punch holes are oriented below the dies, the surface film element 106 may be placed between the dies and the corresponding punch holes such that the micro-cuts 124 are formed when the dies and punch holes are urged together. In one example process, the dies and punch holes may be disposed on roller structures so that a continuous roll or length of the surface film element 106 may be through the rolling dies and punch hole roles to continuously for a series of micro-cuts 124.

Other cutting means may be used in alternative embodiments. For example, but not limited to, a laser system may be used to create the micro-cuts 124. Further, the laser system may be configured to form any shape and/or dimension of interest for the micro-cuts 124.

Figure 2:
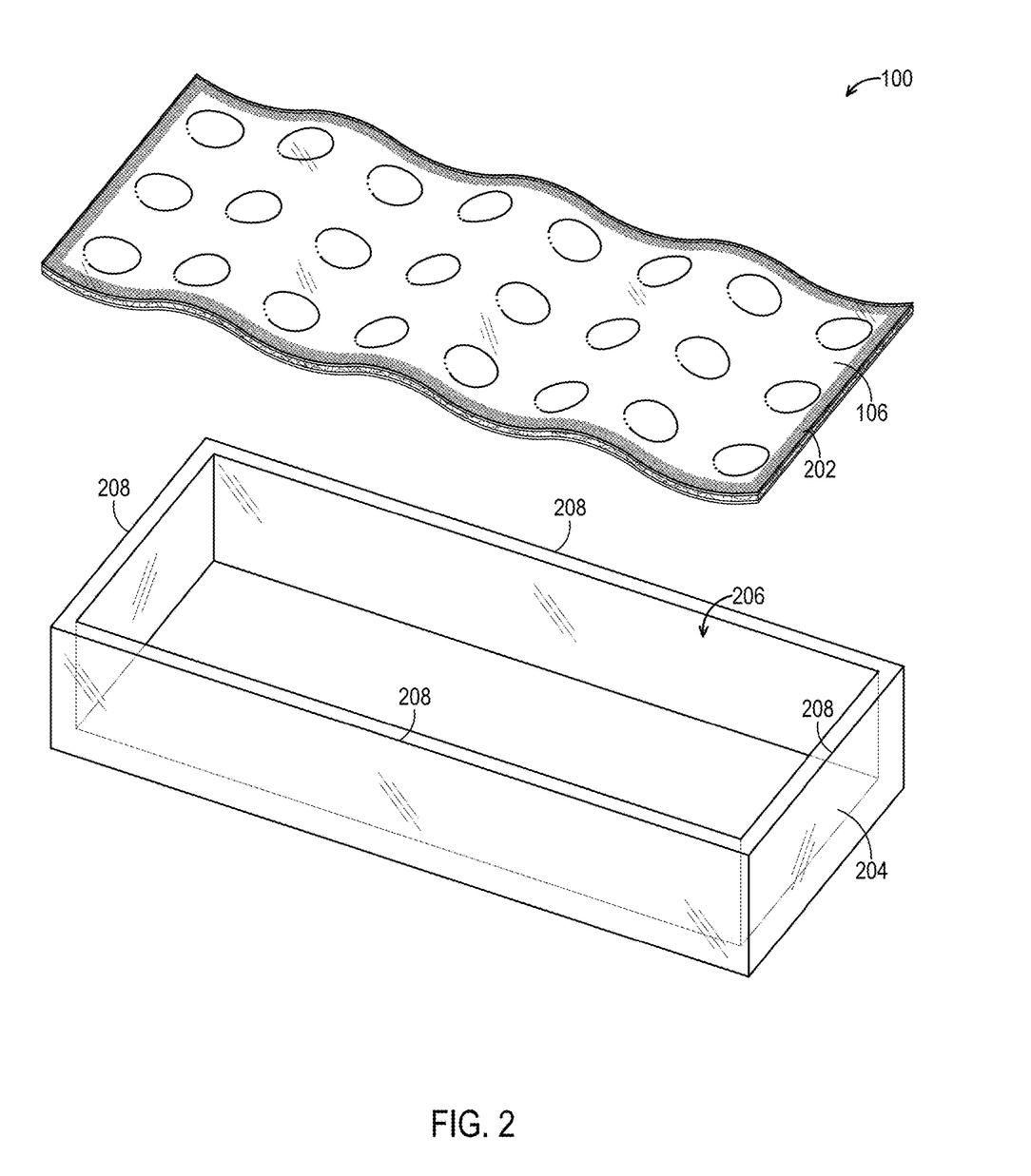
FIG. 2 is a perspective view of the product package filter assembly with the support element, the filter element and the surface film element of FIG. 1 sealably joined together.

FIG. 2 is a perspective view of a nonlimiting example embodiment of the product package filter assembly 100 with the support element 102, the filter element 104, and the surface film element 106 of FIG. 1 sealably joined together during a first fabrication process. In this example embodiment, the same sized and shaped perimeters 110, 118, 122 of the support element 102, the filter element 104, and the surface film element 106 are sealably joined together during the first fabrication process.

During a first example fabrication process, the perimeters 110, 118, 122 of the support element 102, the filter element 104, and the surface film element 106 are placed together in an ordered layer, stack, or the like. Then, a sealing means 202, such as a bead or strip of adhesive. Is applied along the perimeters 110, 118, 122 to sealably join the support element 102, the filter element 104, and the surface film element 106 together into a unibody structure to form the product package filter assembly 100. In the above-described first fabrication processes, the support element 102, the filter element 104, and the surface film element 106 are sealably joined together at the same time. In alternative embodiments, a selected two of the support element 102, the filter element 104, or the surface film element 106 may be sealably joined together, or at select locations, wherein the other layer is later sealably joined to finish the first fabrication process.

When the support element 102, the filter element 104, and the surface film element 106 are made of flexible or semi-flexible materials, the product package filter assembly 100 may be shaped as needed to be sealably joined to a product container 204. In some embodiments if the product package filter assembly 100, a sheet or continuous strip of the layered or stacked support element 102, filter element 104, and surface film element 106 is formed. Here, the lateral perimeters are sealably joined together, or at least are joined together at selected locations. Then, based on the particular characteristics of the product container that the product package filter assembly 100 is to be sealably joined to, the sheet or strip of layered elements 102, 104, 106 may be cut to a desired shape and/or length of interest (which typically corresponds to the dimensions of an opening in the product container that is to be sealably covered by the contaminant filter assembly 100).

In the simplified nonlimiting hypothetical example illustrated in FIG. 2, a nonlimiting example product container 204 is conceptually illustrated as an open ended box (no top surface) wherein the upper edges 208 of the sides of the product container 204 are exposed for securing to the joined perimeters 110, 118, 122 of the product package filter assembly 100. Here the size and shape of the joined perimeters 110, 118, 122 correspond to the size and shape of the upper edges 208 of the product container 204.

During a second fabrication process, the product package filter assembly 100 is placed over the opening of the product container 204 such that the perimeters 110, 118, 122 of the product package filter assembly 100 are aligned with the upper edges 208 of the product container 204. Once in place, the perimeters 110, 118, 122 may be sealably joined to the upper edges 208 of the of product container 204 using any suitable sealing means, thereby creating an airtight seal (cooperatively created by sealably joining the lower surface of the surface film element 106 to the product container 204) such that ambient contaminants and particles are prevented from passing into the interior 206 of the product container 204. In some applications the above-described first fabrication process and this second fabrication process may be concurrently performed together at the same time.

In some embodiments, the size of the support element 102 may be greater than the sizes of the filter element 104 and the surface film element 106. That is, the perimeter 110 may be larger in one or more selected directions (the longitudinal axis and/or the lateral axis) such that the perimeters 118, 122 are sealably joined to the surface of the support element 102. An unexpected advantage of having a larger sized support element 102 is that an attachment of the support element 102, or a portion thereof, to a product container 204 may be more easily made. In such embodiments, the filter element 104 and/or the surface film element 106 do not need to be exactly centered over the opening of the product container 204 during the second fabrication process. Further, the filter element 104 and/or the surface film element 106 may be smaller than the opening of the product container 204, thereby reducing material costs. The area of the filter element 104 and the surface film element 106 only needs to be sufficiently large to vent the generated gases when the product residing in the product container 204 is heated.

Figure 3:
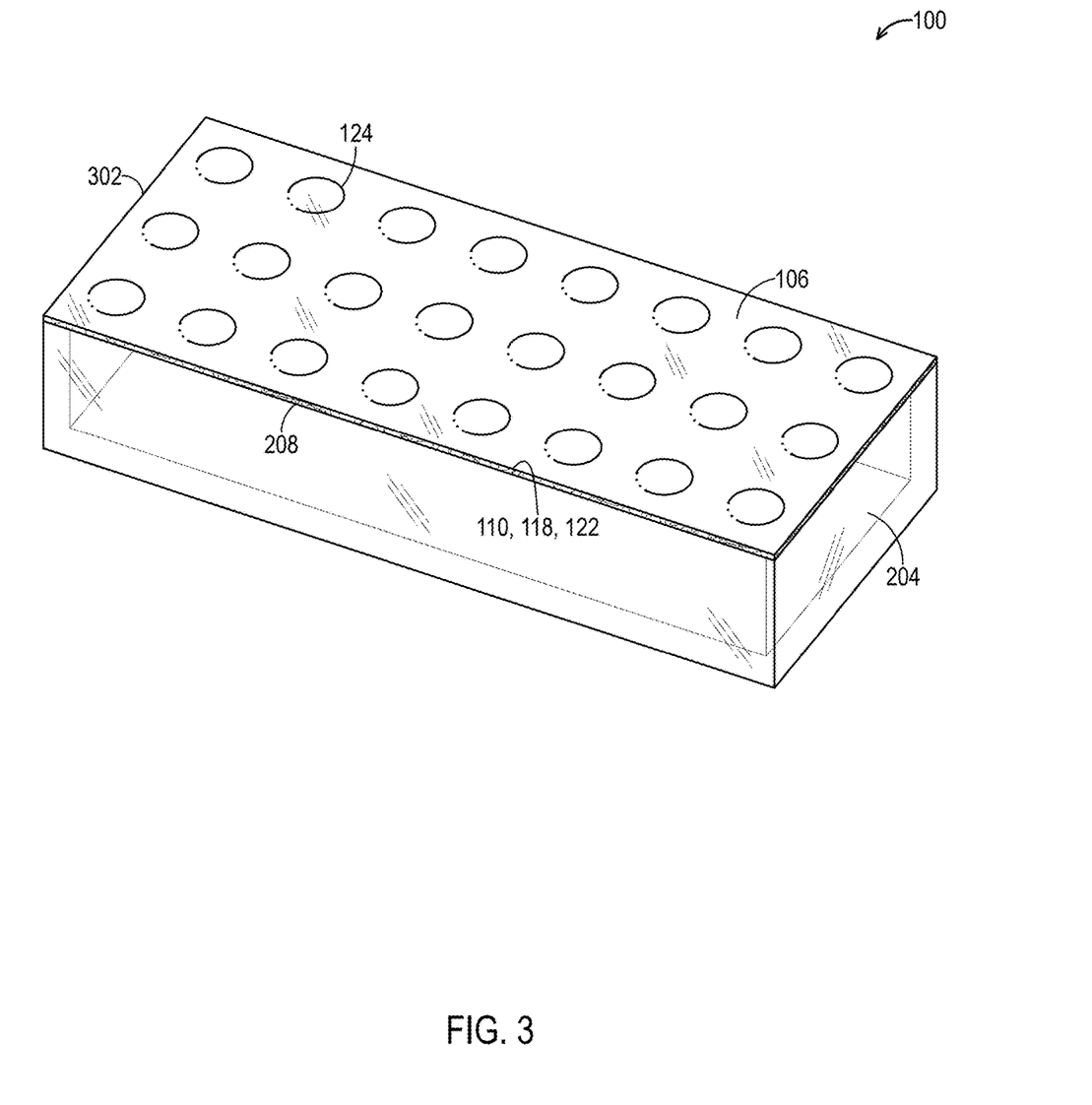
FIG. 3 is a perspective view of the product package filter assembly and the product container after they have been sealably joined together.

FIG. 3 is a perspective view of the product package filter assembly 100 and the product container 204 after they have been sealably joined together after conclusion of the second fabrication process. In this example embodiment, a continuous strip or bead of adhesive has been applied to sealably join the perimeters 110, 118, 122 of the product package filter assembly 100 to the upper edges 208 of the product container 204. Accordingly, a product placed within the interior 206 (FIG. 2) of the product container 204 is secured within the product container 204 in an airtight manner such that solid particles outside of the product container 204 cannot pass into the interior 206 of the product container 204.

In some applications, the product container 204 may be optionally transparent or partially transparent so that a user can view the product residing in the interior 206 of the product container 204. Accordingly, the manufacturer can view the product in the product container 204 for quality assurance, and/or the user may view the product during its heating or cooking. In some embodiments, the support element 102, the filter element 104, and/or the surface film element 106 may also be made of transparent or semi-transparent materials to facilitate the viewing of the product by the manufacturer and/or the user.

An unexpected benefit provided by the sealably joined perimeters 110, 118, 122 is that the filter element 104 (which is sandwiched between the support element 102 and the surface film element 106) is securely held in place during later stages of fabrication where the product package filter assembly 100 is sealably joined with the product container 204. During transportation of the product container 204 and the sealably joined product package filter assembly 100, and/or use of the product container 204 when a product (not shown) residing in the interior 206 of the product container 204 is heated, the filter element 104 is securely held in place. That is, the inner surfaces of the plurality of support members 114 of the support element 102 and the surface film element body 120 frictionally secure the filter element 104 in place. In some embodiments, small amounts of adhesive or another suitable sealing means may be applied to the inner surfaces of the plurality of support members 114 at selected locations, or at selected locations of the inner surface of the surface film element body 120, to further secure the filter element 104 in place.

Further, in embodiments where the support element body portion 108 is semi-rigid or rigid, the size and shape of the support element body portion 108 may be defined to correspond to the opening of the product container 204, and may even serve as part of the product container 204 itself. The semi-rigid or rigid support element 102 results in a semi-rigid or rigid product package filter assembly 100 after the first fabrication process. This semi-rigidity or rigidity of the assembled product package filter assembly 100 facilitates easier joining of the product package filter assembly 100 to the product container 204 by a fabricating person or a robotic system.

In some embodiments, the surface film element 106, or selected portions thereof, may be made of a semi-rigid or rigid material. In such embodiments, the surface film element 106 may provide enhanced integrity of the airtight seal between the product package filter assembly 100 and the product container 204, and/or provide additional protective strength to the product package (cooperatively defined by the product container 204 and the product package filter assembly 100). In other embodiments, additional film layers may be used without departing from the spirit of the invention and the scope of the accompanying claims.

Figure 4:
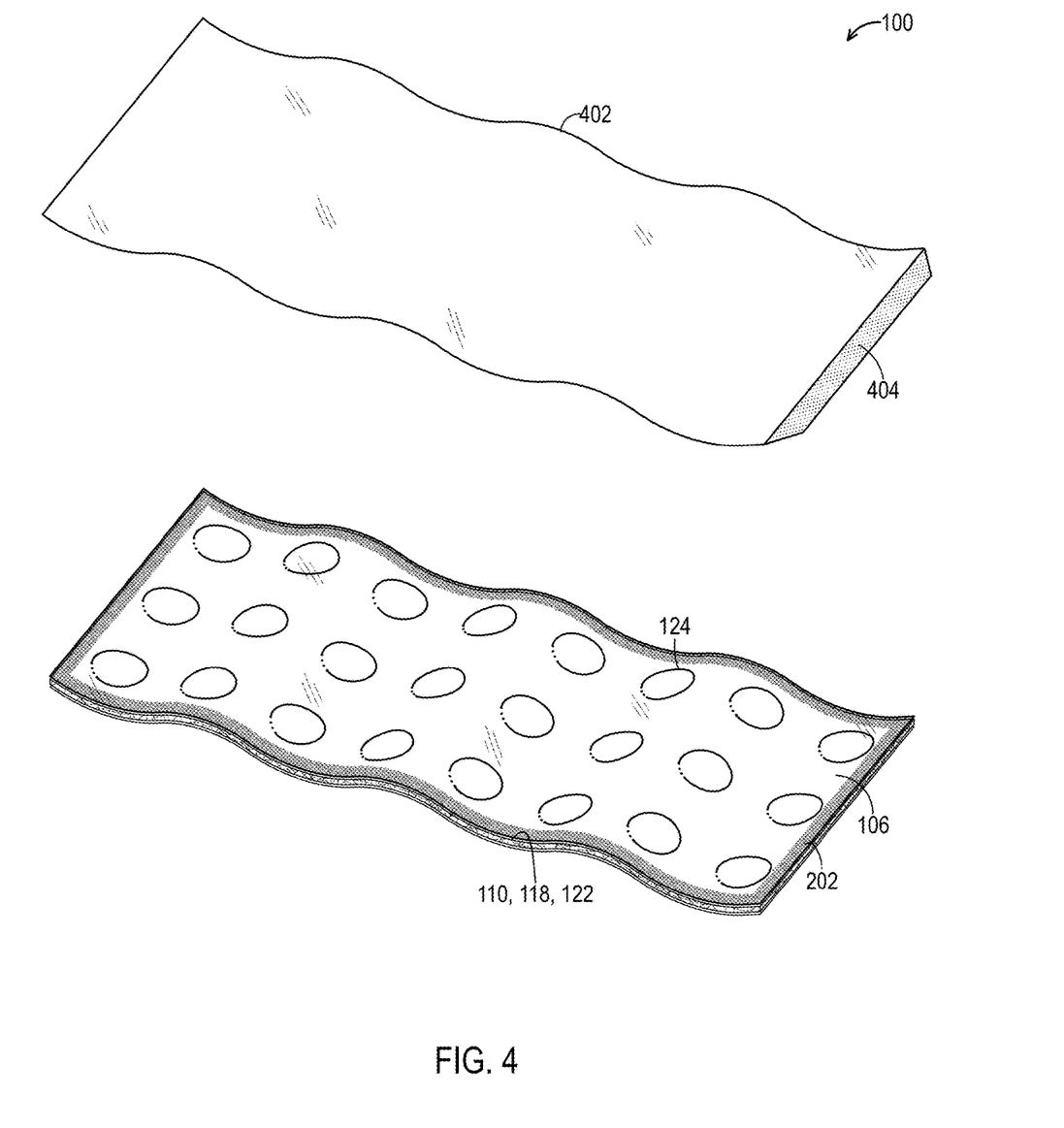
FIG. 4 is an exploded view of a product package filter assembly that further comprises a removeable moisture barrier film.

FIG. 4 is an exploded view of a product package filter assembly 100 that further comprises a removeable moisture barrier film 402 that is an impermeable moisture barrier. In this simplified example, the removeable moisture barrier film 402 is defined by a moisture barrier perimeter 404 that approximately, or exactly, corresponds to the perimeters 110, 118, 122. Accordingly, the removeable moisture barrier film 402 is approximately the size and shape of the support element 102, the filter element 104, and the surface film element 106. In other embodiments, the size of the removeable moisture barrier film 402 is at least large enough to cover the plurality of micro-cuts 124 disposed over the surface of the surface film element 106. Preferably, the removeable moisture barrier film 402 is made of a flexible or semi-flexible material.

The moisture barrier film 402 may be sealably joined to the top surface of the surface film element 106 using any suitable releasing sealing means, proximate to the moisture barrier perimeter 404, prior to sealably joining the elements 102, 104, 106 to the product container 204 (FIG. 2). Alternatively, the moisture barrier film 402 may be sealably joined to the top surface of the surface film element 106 after the elements 102, 104, 106 are sealably joined to the product container 204. In some embodiments, the moisture barrier film 402 may be sealably joined to one or more exterior surfaces of the product container 204. In some embodiments, the moisture barrier film 402 may itself be a separate moisture and airtight package that encases the product container 204 with its sealably joined product package filter assembly 100.

In an example embodiment, the removeable moisture barrier film 402 is releasably secured to the top surface of the surface film element 106 proximate to the bead or strip of sealing means 202 (FIG. 2) that is applied along the perimeters 110, 118, 122 to sealably join the support element 102. That is, the sealing means is releasable so that the moisture barrier film 402 is removeable from the surface film element 106. The removeable moisture barrier film 402 may be secured using another bead or strip of adhesive is applied proximate to the sealing means 202 or proximate to the perimeters 110, 118, 122 to sealably join the removeable moisture barrier film 402 to the top surface of the support element 102.

Since the removeable moisture barrier film 402 has a size that is sufficiently large enough to cover all of the micro-cuts 124, moisture from the ambient environment cannot enter into and/or leave the interior 206 of the product container 204. Prior to use, the removeable moisture barrier film 402 is removed from the surface film element 106 so that gases generated during the heating of the product in the product container 204 may vent out of the micro-cuts 124.

Some embodiments of the removeable moisture barrier film 402 include a pull tab 404 that is readily grasped by the user. Grasping the optional pull tab 404, the user can then peel back the removeable moisture barrier film 402 away from the surface of the surface film element 106 prior to use. The removeable moisture barrier film 402 can then be completely, or partially, removed.

Figure 5A:
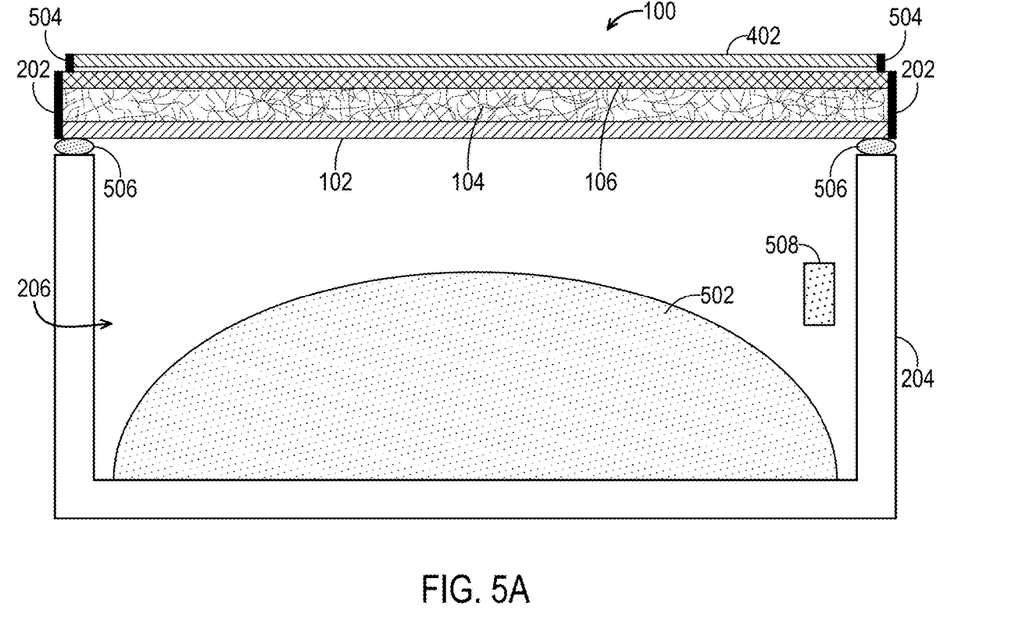
FIGS. 5A-5B are a cross sectional views of the product container, the sealably joined support element, filter element, and surface film element, and the removeable moisture barrier film.

FIG. 5A is a cross sectional view of the product container 204, the sealably joined support element 102, filter element 104, and surface film element 106, and the removeable moisture barrier film 402. A product 502 that is to be heated, thereby releasing a gas into the interior 206 of the container 204, resides within the interior 206 of the product container 204.

In this simplified hypothetical example, the sealing means 202, such as an example bead or strip of adhesive, has been applied along the perimeters 110, 118, 122 to sealably join the support element 102, the filter element 104, and the surface film element 106. The removeable moisture barrier film 402 has separately been sealably joined to the top surface of the surface film element 106 using a selected sealing means 504. After a product 502 has been placed within the interior 206 of the product container 204, the product package filter assembly 100 is oriented over the opening of the product container 204, and then is sealably joined to the product container 204 using a third sealing means 506.

Figure 5B:
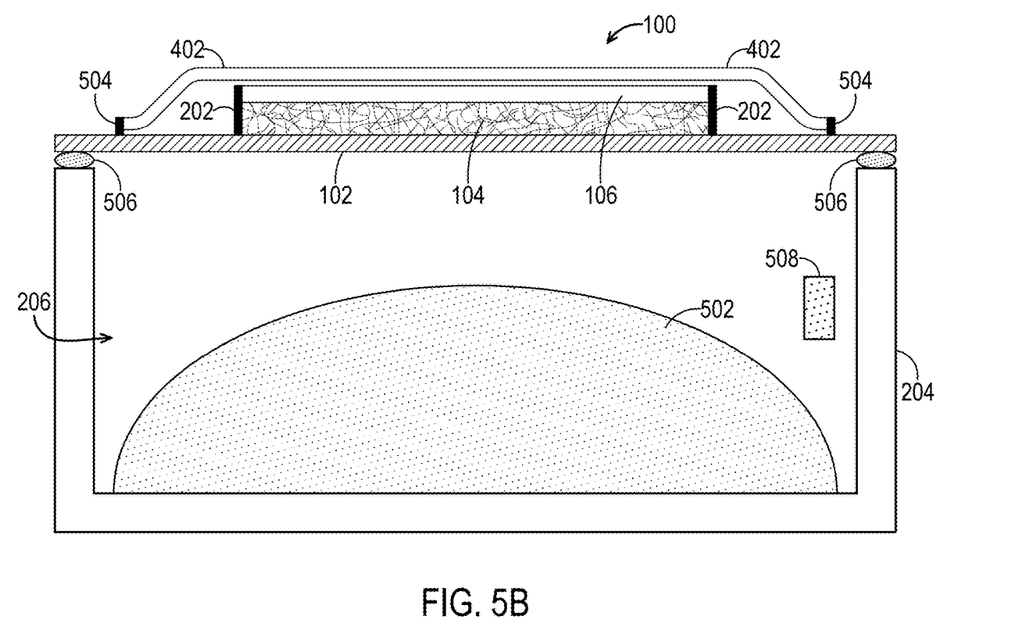

FIG. 5B is a cross sectional view of an embodiment wherein the dimension of the filter element 104 and surface film element 106 are less than the dimensions of the product container 204 and the sealably joined support element 102. The lower perimeter of the support element 102 is secured to the container 204 using the sealing means 506. The sealing means 202 secures the perimeters of the surface film element 106, and optionally the filter element 104, to the upper surface of the support element 102. A removeable moisture barrier film 402 is sealably joined to the top surface of the support element 102 using a selected sealing means 504. In an alternative embodiment, the removeable moisture barrier film 402 is sealably joined to a selected exterior surface of the product container 204 using a selected sealing means 504. The sealing means 504 may include, but is not limited to, an adhesive, a heat seal, a pressure seal, or any other suitable sealing means.

A product 502 resides within the product container 204. When the product 502 is heated, such as during cooking or sterilization, moisture in the product 502 and/or in the product container 204 vaporizes into a gas. The generated gas increases pressure within the product container 204. When the increasing pressure within the product container 204 exceeds the ambient pressure outside of the product container 204, the gasses vent out of the product container 204 through the hinged surface portions 128 as the hinged surface portions 128 are urged outwardly from the surface of the surface film element 106.

As the gases vent out of the product container 204, the filter element 104 prevents any ambient contaminants or particles from entering into the interior of the product container 204. Accordingly, the product 502 cannot be contaminated with ambient particles.

For example, if the product 502 is a food product that is cooked while in the product container 204, and if the user is gluten sensitive, peanut allergic, etc., then the user would be protected since such particles cannot enter into the interior 206 of the product container 204. An unexpected advantage occurs when, for example, the food is cooked or partially cooked in a facility where other gluten and/or peanut based products are or have been prepared. The product 502 may be placed into the interior 206 of the product container 204 in a contaminant free environment. The product package filter assembly 100 is sealably joined to the product container 204 during a packaging process that is performed in the contaminant free environment, such as a gluten free and/or peanut free facility. Then, the product 502 may be transported to, and then cooked or partially cooked, in another facility that may not necessarily be contaminant free.

Another example is sterilization of medical equipment and/or substances. Here, some small amount of fluid (moisture) is introduced into the interior 206 of the product container 204 during the packaging process. For example, an optional moisture member 508 with some predefined amount of liquid may be placed into the interior of the product container 204. The moisture in the moisture member 508 transforms into a gas when heated. An unexpected advantage is that, after packaging by the embodiments of the contaminant filter assembly 100, the surgical equipment may be transported to a first location for sterilization. As the product container 204 and the sterilized surgical tool cool, the filter element 104 prevents entry of any contaminants or particles back into the interior 206 of the product container 204. After sterilization, an optional removeable moisture barrier film 402 may be secured to the product container 204 and/or the surface film element 106 to cover the micro-cuts 124. Then, the sterilized product container 204 may be transported to a second remote location for use during a surgical procedure. The product package filter assembly 100 prevents entry of any contaminants or particles back into the interior 206 of the product container 204 during transportation to the second remote location. The airtight sealed product container 204 may be stored at the second location until use (or even transported to a third remote location of use).

Figure 6:
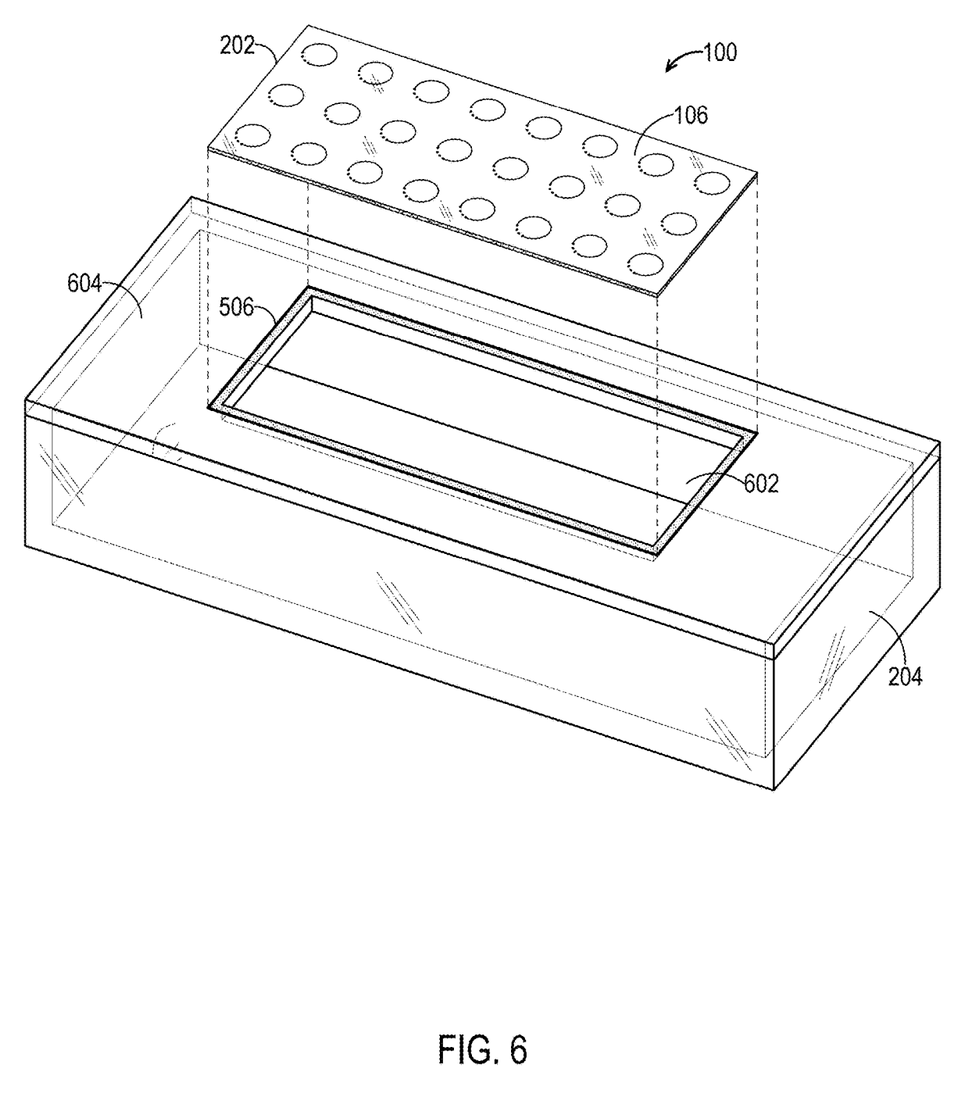
FIG. 6 is a perspective view of a product container that has a relatively small opening disposed on the surface of the product container.

FIG. 6 is a perspective view of a product container 204 that has a relatively small opening 602 disposed on the surface of the product container 204. Here, the opening 602 is conceptually illustrated as being disposed on the top surface 604 of the product container 204. However, the opening 602 may be located on any desired surface, such as the side and/or bottom of the product container 204. The size and shape of the opening 602 may be defined based on any characteristic of interest of the product, the product container 204, and/or the product package filter assembly 100. The opening 602 may be of any size or shape of interest, and only needs to be large enough to permit adequate venting of gas that is generated during the heating process.

Figure 7:
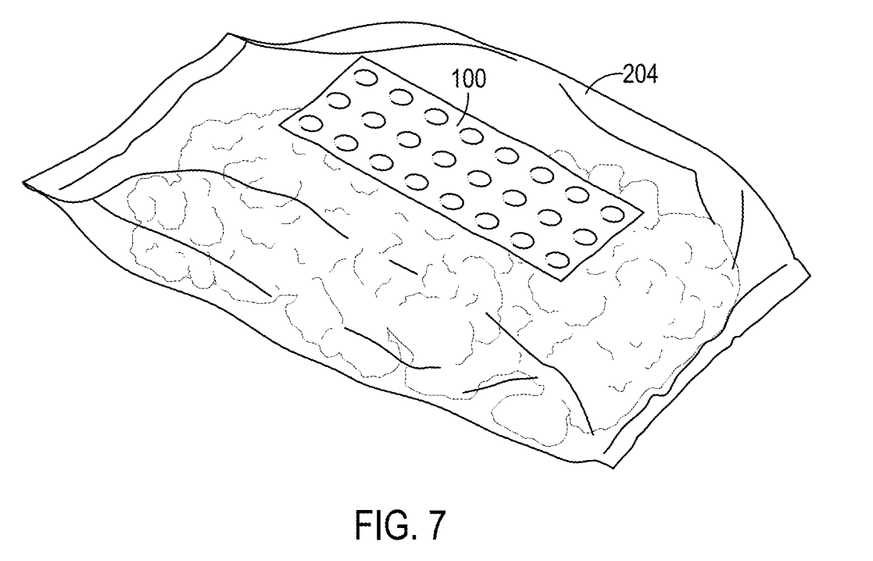
FIG. 7 is a perspective view of a gusseted type product container provisioned with a product package filter assembly sealably joined to a port or opening disposed in the gusset bag.

FIG. 7 is a perspective view of a gusseted type of product container 204 provisioned with a product package filter assembly 100 sealably joined to a port or opening of a predefined size and dimension that is disposed in the gusset bag 204 at a predefined location.

Figure 8:
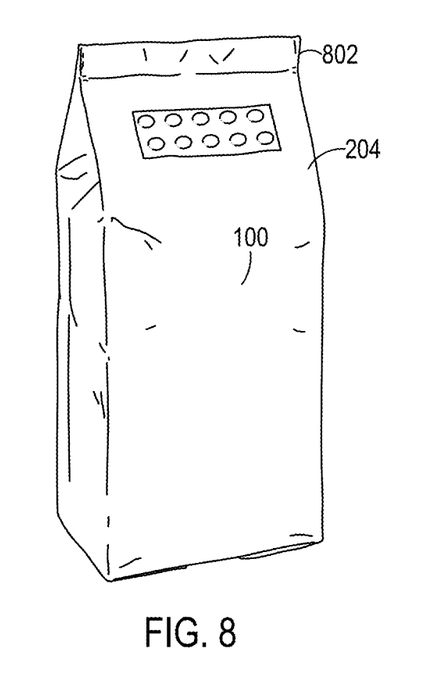
FIG. 8 is a perspective view of a stand-up type product container provisioned with a product package filter assembly sealably joined to a port or opening disposed in the stand-up type bag.

FIG. 8 is a perspective view of a stand-up type of product container 204 provisioned with a product package filter assembly 100 sealably joined to a port or opening disposed in the stand-up type of bag 204. The stand-up type of bag 204 (and/or the gusseted type of product container 204 of FIG. 7) may optionally include a re-sealable top opening 802. One skilled in the art appreciates that embodiments of a product package filter assembly 100 can be sealably joined to any type of product container 204. All such embodiments are intended to be disclosed herein and to be protected by the accompanying claims.

One skilled in the arts appreciates that as a packaged product cools, the volume of any gas within the product container 204 will decrease as the temperature decreases. In the absence of the contaminant filter assembly 100, a sealed package may collapse on itself during cooling since a pressure difference between the interior of the package and the ambient environment results in a vacuum or partial vacuum in the package. A collapse of the package may be undesirable, such as if the collapsing package comes into contact with the product. The collapsing package might deform the product. The collapsing package may also negatively impact the visual appearance of the package. However, embodiments of the contaminant filter assembly 100 permit gas and/or moisture to enter into the product container 204 during cooling. An unexpected advantage provided by embodiments of the contaminant filter assembly 100 is the prevention, or at least partial prevention, of a collapse of the product container 204 during cooling as pressure equalizes.

Figure 9A:
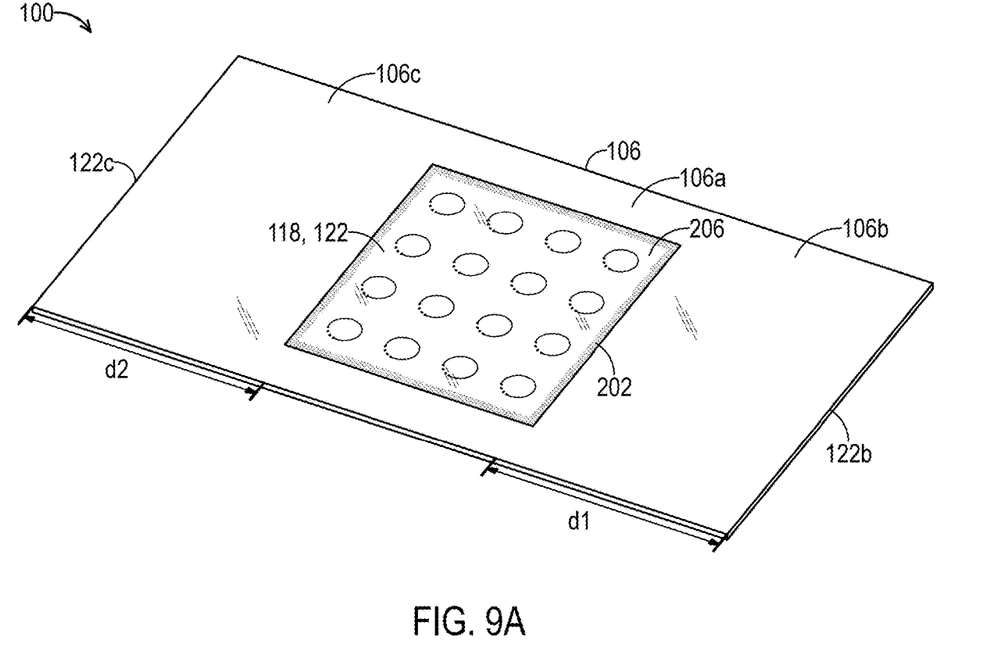
FIG. 9A is a perspective view of a product package filter assembly wherein a length of the support element is greater than the length of the filter element and the surface film element.

FIG. 9A is a perspective view of a product package filter assembly 100 wherein a length of the surface film element 106 (along the longitudinal axis) is greater than the length of the filter element 104. In this embodiment, the optional support element 102 is omitted. The center portion 106a of the surface film element 106 is defined by a plurality of hinged surface portions 128. A bead or strip of adhesive 202 is applied between a lower surface of the surface film element 106 and the filter element 104 to sealably join the filter element 104 and to the lower surface of the center portion 106a of the surface film element 106. In this example embodiment, the surface film element 106 is flexible or semi-flexible. Other sealing means may be used in alternative embodiments.

A first side portion 106b extends outwardly from the sealably joined filter element 104 by a predefined distance D1. A second side portion 106c extends outwardly in an opposing direction from the sealably joined filter element 104 by a predefined distance D2. The distances D1, D2 may be the same or may be different, depending upon the packing application of interest.

Figure 9B:
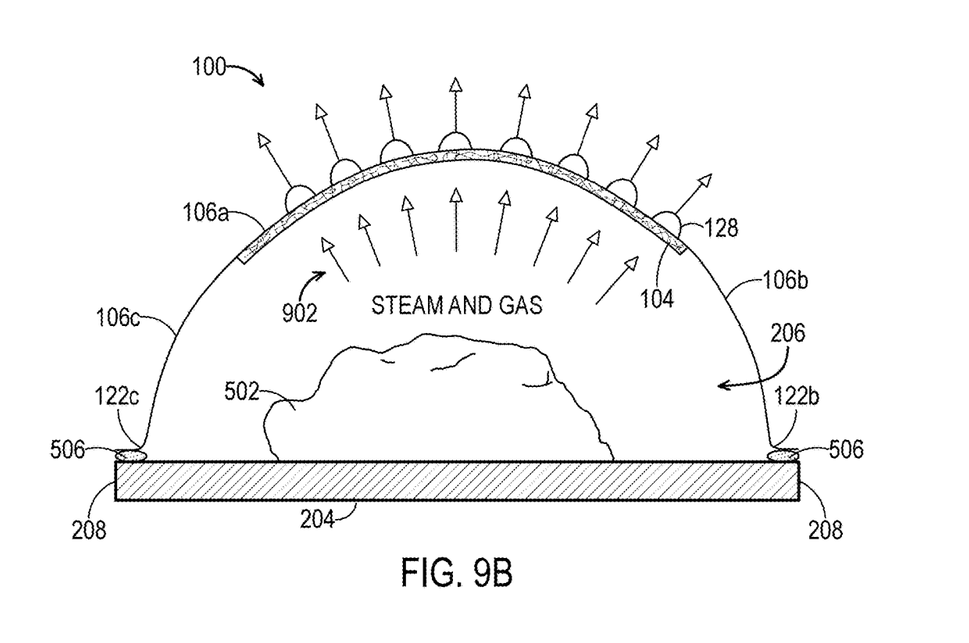
FIG. 9B is a cross sectional view of the product package filter assembly of FIG. 9A secured to a tray type product container.

FIG. 9B is a cross sectional view of the product package filter assembly 100 of FIG. 9A secured to a tray type product container 204. In this example embodiment, the perimeter portion 122c is sealably joined to a first edge 208 of the tray 204 using a bead or strip of adhesive 506. The opposing perimeter portion 122b is also sealably joined to an opposing second edge 208 of the tray 204. One skilled in the art appreciates that other portions of the product package filter assembly 100 are secured to the tray 204 to from an airtight seal. Other sealing means may be used in alternative embodiments.

As the product 502 is heated, the gas 902 is generated. The gas 902 is vented out through the hinged surface portions 128. The hinged surface portions 128 are urged outwardly be the venting gas 902. When the generation of the gas 902 ends, then the hinged surface portions 128 may relax or partially relax, thereby falling onto the top of the filter element 104. Even if an airtight seal is not created by the relaxed hinged surface portions 128, contaminants and/or particles cannot enter into the interior 206 of the product container 204 because of the filtering effect of the filter element 104.

Figure 10A:
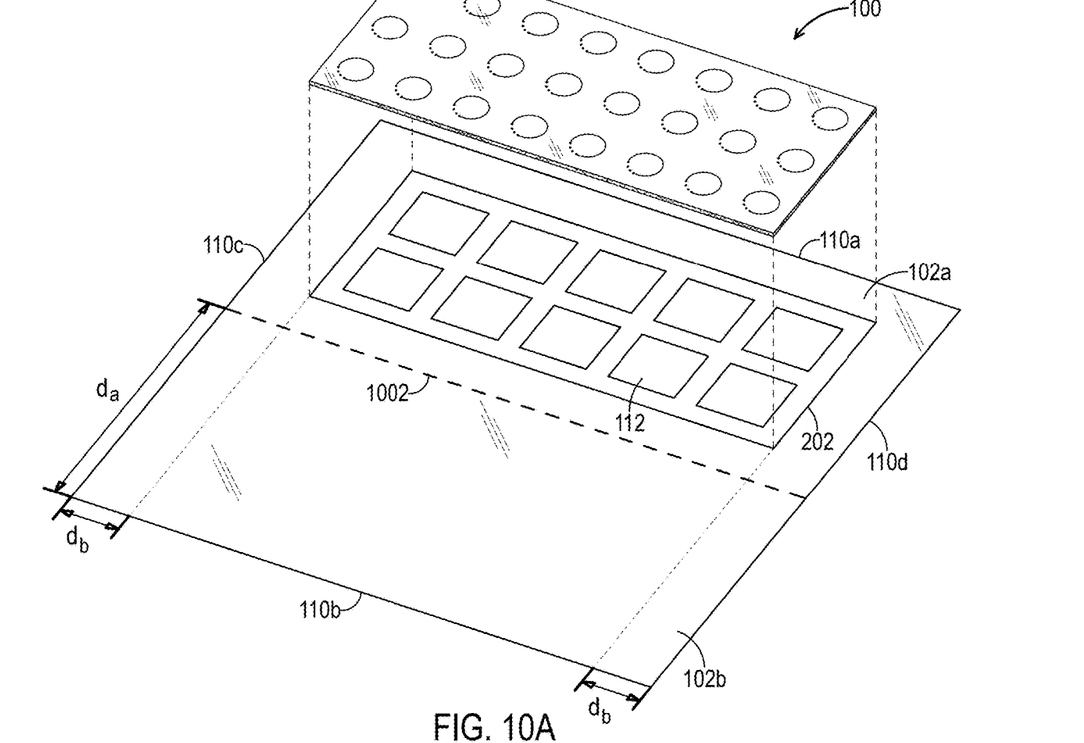
FIG. 10A is a perspective view of a product package filter assembly wherein a width of one side of the support element is greater than the corresponding width of the filter element and the surface film element.

FIG. 10A is a perspective view of a product package filter assembly 100 wherein a width of one side of the support element 102 (along the lateral axis) is greater than the corresponding width of the filter element 104 and the surface film element 106. The first side portion 102a of the support element 102 is defined by a plurality of apertures 112 (not visible). The size of the first side portion 102a is larger than a size of the filter element 104 and the surface film element 106. Also, a width of the second side portion 102b is longer than the corresponding width of the first side portion 102a by a predefined distance Da. A bead or strip of adhesive 202 is applied between a lower surface of the surface film element 106 and an upper surface of the filter element 104 to sealably join the filter element 104 and to the lower surface of the center portion 106a of the surface film element 106 along the perimeter edges 110a and 110b. The length of the support element 102, in this non-limiting example embodiment, is greater than the corresponding length of the filter element 104 and the surface film element 106 by a predefined distance Db. In this example embodiment, the surface film element 106 is flexible or semi-flexible. Other sealing means may be used in alternative embodiments.

Figure 10B:
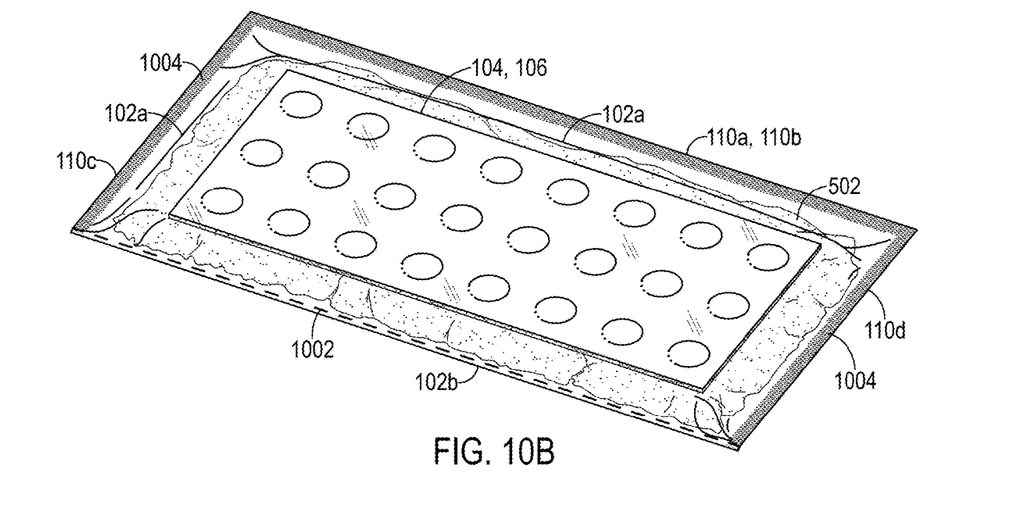
FIG. 10B is a perspective view of the product package filter assembly of FIG. 10A.

FIG. 10B is a perspective view of the product package filter assembly 100 of FIG. 10A. Here, the first side portion 102a and the second side portion 102b are folded over around a fold line 1002. The perimeter edges 110a and 110b are sealably joined together using a selected sealing means. Some embodiments may employ a bead or strip of adhesive, a crimp, a heat seal, or other sealing means 1004 to form a pouch-like container that retains the product 502. That is, the support element 102 is folded over and sealably joined to create the equivalent product container 204.

In some applications, the support element 102 may be folded around the product 502 and then the edges 110a, 110b may be sealably joined. Then, the ends 110c and 110d may each be sealably joined to secure the product 502 in an air tight container. Any suitable sealing means may be used in the various embodiments.

Alternatively, the support element 102 may be initially folded to sealably join the edges 110a, 110b, thus forming an empty pouch-like container 204. The product 502 may then be inserted into the interior of the pouch-like container. Then, the ends 110c and 110d may each be sealably joined to secure the product 502 in an airtight container. In some applications, a continuous length of the empty pouch-like container may be formed, and then later cut as needed to a desired length.

While the preferred embodiment of the invention has been illustrated and described, as noted above, many changes can be made without departing from the spirit and scope of the invention. Each disclosure of a component preferably having a feature or characteristic is intended to also disclose the component as being devoid of that feature or characteristic, unless the principles of the invention clearly dictate otherwise. Accordingly, the scope of the invention is not limited by the disclosure of the preferred embodiment. Instead, the invention should be determined entirely by reference to the claims that follow. It should also be noted that the claim dependencies or combinations of elements recited in the claims does not reflect an intention to forgo claiming other subject matter disclosed herein. Instead, this disclosure is intended to also disclose the subject matter of any combination of any two or more of the claims, such that subsequent claim sets may recite that any one of the dependent claims depends from any other one or more claims, up to and including all other claims in the alternative (such as "The apparatus or method of any one of the preceding or subsequent claims . . . "). This disclosure is also intended to disclose the subject matter of any one of the dependent claims, as if it was an independent claim, with or without all or a portion of the subject matter of the original independent claim(s) or any other subject matter disclosed herein.

The invention claimed is:

1. A product package filter assembly, comprising:
   a support element, wherein the support element is defined by:
      a support element body;
      a support element perimeter, and
      at least one aperture disposed in the support element body;
   a filter element, wherein the filter element is defined by:
      a filter element body; and
      a filter element perimeter,
   a surface film element, wherein the surface film element is defined by:
      a surface film element body;
      a plurality of micro cuts disposed in the surface film element body that extend through the surface film element body; and
      a surface film element perimeter; and
   a sealing means,
   wherein the support element, the filter element, and the surface film element are arranged in a layer with the filter element disposed between the support element and the surface film element,
   wherein at least the support element perimeter and the surface film element perimeter are sealably joined together using the sealing means to form an airtight barrier between the support element perimeter and the surface film element perimeter,
   wherein a first end and a second end of each micro cut cooperatively define a corresponding fold line of a predefined length, and
   wherein each micro cut and corresponding fold line cooperatively define a hinged surface portion.

2. The product package filter assembly of claim 1,
   wherein in response to heating a product residing in an interior of a product container that is sealably joined to the product package filter assembly, a gas is generated that increases an interior pressure within the interior of the product container so that the interior pressure becomes greater than an ambient pressure,
   wherein the increasing interior pressure urges the hinged surface portion to move outwardly to let the generated gas vent out through the product package filter assembly, and
   wherein filter element prevents ambient particles from entering into the interior of the product package when the hinged surface portion is outwardly moved.

3. The product package filter assembly of claim 2,
   wherein after completion of the heating of the product, the interior of the product package cools such that the interior pressure becomes less than an ambient pressure, and
   wherein the filter element prevents the hinged surface portion from moving inwardly in response to the cooling of the interior of the product package.

4. The product package filter assembly of claim 1, wherein the support element perimeter, the filter element perimeter, and the surface film element perimeter are sealably joined together using the sealing means.

5. The product package filter assembly of claim 4,
   wherein in response to heating a product residing in an interior of a product container that is sealably joined to the product package filter assembly, a gas is generated that increases an interior pressure within the interior of the product container so that the interior pressure becomes greater than an ambient pressure,
   wherein the gas vents out of the product container into an ambient region around the product container firstly via the at least one aperture disposed in the support element body, secondly via the filter element body, and thirdly via the at least one micro cut disposed in the surface film element body.

6. The product package filter assembly of claim 1, wherein the sealing means is a first sealing means, wherein the support element is defined by a first side portion and a second side portion, wherein the at least one aperture is disposed in the first side portion, and wherein a fold line separates the first side portion and the second side portion, and further comprising:
   a second sealing means,
   wherein the second sealing means sealably joins a first perimeter edge of the first side portion with a second perimeter edge of the second side portion,
   wherein the first side portion and the second side portion cooperatively define a pouch-like container.

7. The product package filter assembly of claim 6, further comprising:
   a third sealing means,
   wherein the third sealing means sealably joins a first end of the product package filter assembly; and a fourth sealing means,
wherein the fourth sealing means sealably joins a second end of the product package filter assembly, and
wherein the second end of the product package filter assembly is opposing the first end of the product package filter assembly.

8. The product package filter assembly of claim 7, wherein after the third sealing means sealably joins the first end of the product package filter assembly and before the fourth sealing means sealably joins the second end of the product package filter assembly, a product is inserted into an interior of the pouch-like container.

9. A product package filter assembly, comprising:
a support element, wherein the support element is defined by:
  a support element body;
  a support element perimeter; and
  at least one aperture disposed in the support element body;
a filter element, wherein the filter element is defined by:
  a filter element body; and
  a filter element perimeter,
a surface film element, wherein the surface film element is defined by:
  a surface film element body;
  at least one micro cut disposed in the surface film element body that extends through the surface film element body; and
  a surface film element perimeter;
a first sealing means, and
a second sealing means,
wherein the support element, the filter element, and the surface film element are arranged in a layer with the filter element disposed between the support element and the surface film element,
wherein at least the support element perimeter and the surface film element perimeter are sealably joined together using the first sealing means to form a first airtight barrier between the support element perimeter and the surface film element perimeter, and
wherein the second sealing means sealably joins a bottom surface of the support element to a surface of a product container so that a second airtight barrier is formed between at least the perimeter of the support element and the surface of the product container.

10. The product package filter assembly of claim 9, wherein the at least one micro cut is one of a plurality of micro cuts disposed in the surface film element body, and further comprising:
a moisture barrier film that is an impermeable moisture barrier and that is defined by a moisture barrier perimeter; and
a third sealing means that sealably joins a top surface of the surface film element with a bottom surface of the moisture barrier proximate to the moisture barrier perimeter,
wherein the third sealing means is releasable so that the moisture barrier film is removeable from the surface film element, and
wherein a size of the moisture barrier film is large enough to cover the plurality of micro cuts disposed in the surface film element.

11. The product package filter assembly of claim 9, further comprising:
a moisture member that retains a predefined amount of liquid,
wherein the moisture member resides in an interior of the product container, and
wherein the liquid in the moisture member transforms into a gas when heated.

12. The product package filter assembly of claim 9, wherein the at least one micro cut is one of a plurality of micro cuts disposed in the surface film element body,
wherein a first end and a second end of each micro cut cooperatively define a corresponding fold line of a predefined length, and
wherein each micro cut and corresponding fold line cooperatively define a hinged surface portion.

13. A product package filter assembly, comprising:
a support element, wherein the support element is defined by:
  a support element body;
  a support element perimeter; and
  at least one aperture disposed in the support element body;
a filter element, wherein the filter element is defined by:
  a filter element body; and
  a filter element perimeter,
a surface film element, wherein the surface film element is defined by:
  a surface film element body;
  a plurality of micro cuts disposed in the surface film element body that extend through the surface film element body; and
  a surface film element perimeter;
a sealing means;
a moisture barrier film that is an impermeable moisture barrier and that is defined by a moisture barrier perimeter; and
a second sealing means that sealably joins a top surface of the surface film element with a bottom surface of the moisture barrier proximate to the moisture barrier perimeter,
wherein the support element, the filter element, and the surface film element are arranged in a layer with the filter element disposed between the support element and the surface film element,
wherein at least the support element perimeter and the surface film element perimeter are sealably joined together using the first sealing means to form a first airtight barrier between the support element perimeter and the surface film element perimeter,
wherein the second sealing means is releasable so that the moisture barrier film is removeable from the surface film element, and
wherein a size of the moisture barrier film is large enough to cover the plurality of micro cuts disposed in the surface film element.

14. The product package filter assembly of claim 13, further comprising:
a third sealing means,
wherein the third sealing means sealably joins a bottom surface of the support element to a surface of a product container so that a second airtight barrier is formed between at least the perimeter of the support element and the surface of the product container.

15. The product package filter assembly of claim 13,
wherein a first end and a second end of each micro cut cooperatively define a corresponding fold line of a predefined length, and
wherein each micro cut and corresponding fold line cooperatively define a hinged surface portion.

16. A product package filter assembly, comprising:
a support element, wherein the support element is defined by:
- a support element body;
- a support element perimeter; and
- at least one aperture disposed in the support element body;

a filter element, wherein the filter element is defined by:
- a filter element body; and
- a filter element perimeter, a surface film element, wherein the surface film element is defined by:
- a surface film element body;
- at least one micro cut disposed in the surface film element body that extends through the surface film element body; and
- a surface film element perimeter; and a sealing means,
wherein the support element, the filter element, and the surface film element am arranged in a layer with the filter element disposed between the support element and the surface film element,
wherein at least the support element perimeter and the surface film element perimeter are sealably joined together using the sealing means to form an airtight barrier between the support element perimeter and the surface film element perimeter, and
wherein the first aperture is one of a plurality of apertures disposed in the support element, wherein between each adjacent aperture is a support member, and wherein the support member and a corresponding lower surface of the surface film element frictionally retain the filter element.

17. The product package filter assembly of claim 16, wherein the at least one micro cut is one of a plurality of micro cuts disposed in the surface film element body, wherein a first end and a second end of each micro cut cooperatively define a corresponding fold line of a predefined length, and wherein each micro cut and corresponding fold line cooperatively define a hinged surface portion.

18. A product package filter assembly, comprising:
a surface film element, wherein the surface film element is defined by:
- a surface film element body;
- a plurality of micro cuts disposed in the surface film element body that extend through the surface film element body; and
- a surface film element perimeter;

a filter element, wherein the filter element is defined by:
- a filter element body; and
- a filter element perimeter;

a sealing means,
wherein the surface film element is disposed on top of the filter element,
wherein the surface film element perimeter is sealably joined to a bottom side of the surface film element using the sealing means to form an airtight barrier between the surface film element perimeter and the bottom side of the surface film element,
wherein a first end and a second end of each micro cut cooperatively define a corresponding fold line of a predefined length, and
wherein each micro cut and corresponding fold line cooperatively define a hinged surface portion.

19. The product package filter assembly of claim 18, wherein the sealing means is a first sealing means, wherein the airtight barrier is a first airtight barrier, and further comprising:
a second sealing means,
wherein the second sealing means sealably joins the bottom surface of the surface film element to a surface of a product container so that a second airtight barrier is formed between at least the perimeter of the support element and the surface of the product container.

20. The product package filter assembly of claim 19, wherein the second sealing means is proximate to the surface film element perimeter.

* * * * *